(12) United States Patent
Powell et al.

(10) Patent No.: US 10,101,100 B2
(45) Date of Patent: Oct. 16, 2018

(54) MODULAR COUNTERFLOW FILL HANGING SYSTEM APPARATUS AND METHOD

(71) Applicant: SPX Cooling Technologies, Inc., Overland Park, KS (US)

(72) Inventors: Randall W. Powell, Louisburg, KS (US); Duane Krehbiel, Overland Park, KS (US); Jeff McMillen, Overland Park, KS (US); Paul W. Hink, Shawnee, KS (US); Eldon F. Mockry, Lenexa, KS (US)

(73) Assignee: SPX Cooling Technologies, Inc., Overland Park, KS (US)

( * ) Notice: Subject to any disclaimer, the term of this patent is extended or adjusted under 35 U.S.C. 154(b) by 214 days.

(21) Appl. No.: 15/183,330

(22) Filed: Jun. 15, 2016

(65) Prior Publication Data
US 2016/0290746 A1    Oct. 6, 2016

Related U.S. Application Data

(62) Division of application No. 14/163,579, filed on Jan. 24, 2014, now Pat. No. 9,400,144.

(60) Provisional application No. 61/780,542, filed on Mar. 13, 2013.

(51) Int. Cl.
*F28F 25/08* (2006.01)
*B23P 15/26* (2006.01)

(52) U.S. Cl.
CPC .............. *F28F 25/08* (2013.01); *B23P 15/26* (2013.01); *Y10T 29/4935* (2015.01)

(58) Field of Classification Search
CPC ........ F28F 25/08; B23P 15/26; Y10T 29/4935
USPC ................... 261/108, 112.1, 112.2, DIG. 11
See application file for complete search history.

(56) References Cited

U.S. PATENT DOCUMENTS

| | | | | |
|---|---|---|---|---|
| 2,470,652 A * | 5/1949 | Scofield | ................ | B01D 3/008 261/100 |
| 2,809,818 A * | 10/1957 | Munters | ................ | B01D 50/00 159/4.04 |
| 3,751,017 A * | 8/1973 | Lemmens | ............. | F28F 25/085 261/111 |
| 4,269,794 A * | 5/1981 | Bosne | ....................... | F28B 1/06 169/42 |
| 4,591,462 A * | 5/1986 | Peterson | .................. | A62C 3/00 169/42 |
| 6,032,993 A * | 3/2000 | Kwon | ....................... | B66C 1/66 294/215 |
| 9,400,144 B2 * | 7/2016 | Powell | .................... | F28F 25/08 |
| 9,470,463 B2 * | 10/2016 | Powell | .................... | F28F 25/08 |
| 2011/0278871 A1 * | 11/2011 | Haun | ........................ | B66C 1/36 294/215 |
| 2012/0319312 A1 * | 12/2012 | Mockry | ................ | F28F 25/087 261/112.1 |

* cited by examiner

*Primary Examiner* — Charles S Bushey
(74) *Attorney, Agent, or Firm* — Baker & Hostetler LLP

(57) ABSTRACT

A heat exchange fill apparatus for use with a cooling tower that employs a support frame assembly. The heat exchange fill apparatus has a media fill pack that is comprised of fill pack media modules wherein a stake, prevents the modules from shifting with respect to one another. The modules are installed in a cooling tower of the like via a hanging fill support.

12 Claims, 8 Drawing Sheets

MODULAR COUNTERFLOW FILL HANGING SYSTEM APPARATUS AND METHOD

CROSS-REFERENCE TO RELATED APPLICATIONS

This application claims priority to and is a divisional of U.S. patent application entitled, MODULAR COUNTERFLOW FILL HANGING SYSTEM APPARATUS AND METHOD, filed Jan. 24, 2014, having a Ser. No. 14/163,579, now U.S. Pat. No. 9,400,144, the disclosure of which is hereby incorporated by reference in its entirety.

FIELD OF THE INVENTION

The present invention relates generally to a hanging film fill pack for use for heat exchange in a cooling tower or the like. More particularly, the present invention relates to a modular hanging fill pack design and method that is efficient and economical to assemble and install in a cooling tower.

BACKGROUND OF THE INVENTION

Industrial water cooling towers have long been used to reject heat in power generation, to provide cooling water for petrochemical processes, industrial processes or the like, and serve as a means to lower the temperature of various chemical process streams and equipment. In the case of power generation plants, the cooling tower requirements can be relatively large and it is often times the practice to fabricate increasingly larger cooling towers. Counterflow towers have been found to be especially useful in these instances because of the efficiency of the towers and the compact nature of the structure. Cooling air may be brought into heat exchange relationship with the hot water either by way of convection through use of a natural draft stack, or by means of one or more large diameter, power-driven fans.

In order to further increase the efficiency of cooling towers for industrial applications which require the use of very large towers, efforts have been made to increase the effectiveness of heat exchange between the hot water and the cooling air. The degree of direct contact of the water to be cooled with the coolant air has a significant bearing on the efficiency of the cooling process. Counterflow towers, wherein the hot water and air are brought into countercurrent flow relationship have long been known to be efficient heat transfer units. Initial egg crate or slat splash bar towers were ultimately supplanted by film fill towers because of the greater heat transfer properties of a water film as compared with the multiplicity of droplets of water which are produced by splash fills. Furthermore, film fills are typically significantly shorter than splash fills thus decreasing the head on the pump delivering hot water to the tower and making operating less expensive because of the lower horsepower pump requirements.

The superior heat transfer characteristics of counterflow towers as well as improved efficiency based on lower pump heads has increased their desired use in industrial applications. Cooling tower designers in seeking to increase the efficiency of counterflow towers have also sought to further decrease the overall height of such towers by making the fill more effective than has been the case in the past. With the advent of synthetic resin sheets which are capable of withstanding higher temperatures without significant deformation than was previously the case, along with the development of resin formulations which are more resistant to deterioration under constant wet conditions, fill assemblies made up of sheets of the plastic for film flow of water thereover have in many instances completely supplanted prior fill structures which primarily relied upon break-up of the water for surface increase purposes instead of thin films of water over a large multiplicity of closely spaced sheets of plastic.

Although film fills have found acceptance in many applications including large industrial cooling towers for power generating plants and the like, problems have arisen by virtue of the fact that governmental regulatory agencies have imposed stricter limitations on the addition of agents to the cooling water which suppress growth of microorganisms and the like. For example, it has long been the practice to add chlorine or chlorine containing compounds to the cooling water in order to prevent microorganism growth. However, it is now known that when chlorine in high concentrations is discharged into streams or other natural bodies of water, the chlorine can produce adverse consequences which are harmful to biological life in the stream and in general increase what some deem to be undesirable pollution of the flowing water.

Cooling tower operators have routinely removed a portion of the cooling tower water in the form of blow down and returned it to the source such as a stream to prevent buildup of chemical additives in the water. As much as 10% of the water may be continuously returned to the stream or other water source as blow down. This water can contain a relatively high concentration of the additive and therefore significant amounts of chlorine, for example, may be present at the outlet of the cooling tower which discharges into the adjacent stream, lagoon, or lake water source. Concern over stream and water body pollution has led governmental authorities to restrict the use of additives such as chlorine in cooling tower water for preventing growth of microorganisms in the recirculating cooling water. In fact, absent a more acceptable anti-microbial additive than chlorine and which is available at a reasonable cost, many tower operators have elected to simply eliminate or drastically reduce the additives such as chlorine in the cooling tower water.

The result of the above discussed regulations is the build up of microorganism growth in the flow assembly of counterflow industrial water cooling towers. One highly effective and efficient fill assembly for counterflow towers employs corrugated plastic sheets, however microorganisms can proliferate in such fills. As the water to be cooled flows downwardly through the corrugated fill structure, microorganisms present in the water and whose growth is no longer inhibited by suitable anti-microbial compounds in the water, collect at the points of intersection of the corrugations of the fill. The microorganisms then start to multiply at the nodal points in the fill assembly. This growth can continue until complete blockage of the water flow paths through the fill unit occurs.

In like manner, unless the cooling tower water is continuously filtered, suspended solids in the make-up water from the stream or other natural water source can collect and accumulate in the water. These solids are trapped by the microorganism growths in the fill assembly and increase blockage of the water flow paths. In addition, airborne solids can build up in the water during tower operation unless the water is filtered.

The significance of the problem is apparent when it is recognized that in the case of a 500 megawatt power plant, if the plant must be shut down because of blockage of the fill assembly of the cooling tower serving such plant, the loss of revenue to the utility is many thousands of dollars per day.

Replacement of the fill can take from one to two months. Thus, lost revenues readily mount to eight figure numbers.

The enormity of the problem is further demonstrated by the fact that cooling towers of the type discussed and especially those used for high-megawatt plants such as a nuclear facilities, have fill assemblies whose plan area can be anywhere from one to four acres. Moreover, oftentimes the cooling towers of the type discussed employ hanging fill systems which consist of wire and tube arrangements suspended from pins or bolting systems. These current systems are very labor intensive, requiring a large amount of field labor to assemble the fill racks and to hang the fill individually from the pins in the tower. Thus, to replace such fill can very labor intensive to remove the current fill and replace it with new fill.

Accordingly, it is desirable to provide a counter-flow hanging fill design and system that is economical and efficient to install in a cooling tower. More specifically, it is desirable to provide a modular counterflow hanging fill system that provides preassembled fill modules that are easily and efficiently installed in a cooling tower or the like, reducing the labor efforts to assemble the same, and accordingly reducing assembly costs along with reducing down time of the cooling tower when replacing said fill.

SUMMARY OF THE INVENTION

In one embodiment of the present invention, a heat exchange media fill block is provided, comprising: a first heat exchange fill pack; a second heat exchange fill pack; a stake, wherein said stake pierces said first fill module and extends through said first heat exchange fill pack to pierce said second heat exchange fill pack to prevent the first and second heat exchange fill packs from shifting with respect to one another.

In one embodiment of the present invention, a heat exchange media fill block is provided, comprising: a first heat exchange fill pack; a base frame that supports said first heat exchange fill pack; a stake, wherein said stake pierces said first heat exchange fill pack and extends through said first heat exchange fill pack wherein said stake is received by said base frame.

In another embodiment of the present invention, a hanging fill support bracket for use in a cooling tower of the like is provided, comprising: a first side having a first upper portion and a first lower portion; a second side opposing said first side that has a second upper portion and a second lower portion; a top connect to said first and second sides that extends between said first and second upper portions; and a shaft having a first and second end that extends between the first lower portion and the second lower portion, wherein said shaft is retained by each said first and second lower portion.

In another embodiment of the present invention, a heat exchange fill apparatus for use with a cooling tower is provided, comprising: a support frame assembly; a media fill block, comprising: a first heat exchange fill pack; a second heat exchange fill pack; and a stake, wherein said stake pierces said first heat exchange fill pack and extends through said first heat exchange fill pack to pierce said second heat exchange fill pack to prevent the first and second heat exchange fill packs from shifting with respect to one another; a base frame that supports said first heat exchange fill pack and said second heat exchange fill pack; at least one cable that extends through the media fill block, wherein said at least one cable is connected to said base frame; wherein said stake extends at least partially through said first and second heat exchange fill packs and is received by the base frame; a hanging fill support bracket that attaches to said support frame assembly, said support bracket comprising: a first side having a first upper portion and a first lower portion; a second side opposing said first side that has a second upper portion and a second lower portion; a top connect to said first and second sides that extends between said first and second upper portions; and a shaft having a first and second end that extends between the first lower portion and the second lower portion, wherein said shaft is retained by each said first and second lower portion, wherein said at least one cable is connected to said hanging fill support bracket.

In yet another embodiment of the present invention, a method for assembling a fill pack for use in a cooling tower is provided, comprising the steps of: placing a first fill pack on a base; placing a second fill pack adjacent said first fill pack on the base; inserting a stake through said first fill pack; optionally inserting the stake through said second fill pack; engaging the base with said stake to retain the first fill pack and optionally the second fill pack.

In still another embodiment of the present invention, a method for conducting heat exchange using a cooling tower is provided, comprising: passing a fluid to be cooled a fill block comprising: a first heat exchange fill pack; a second heat exchange fill pack; a stake, wherein said stake pierces said first fill pack and extends through said first heat exchange fill pack to a base to prevent the first heat exchange fill pack from shifting; and generating an air current; and passing the air current over the fill block.

In another embodiment of the present invention, a heat exchange fill pack for use in a cooling tower is provided, comprising: means for placing a first fill pack on a base; means for placing a second fill pack adjacent said first fill pack on the base; means for inserting a stake through said first fill pack; optional means for inserting the stake through said second fill pack; means for engaging the base with said stake to retain the first fill pack and the second fill pack.

In another embodiment of the present invention, a beam bracket for use with a cooling tower is provided, comprising: a first halve having a first top portion, a second side wall and a first sloped portion; a second halve having a second top portion, a second side wall and a second sloped portion, wherein said second halve engages said first halve; a first bolt that engages said first top portion to said second top portion.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
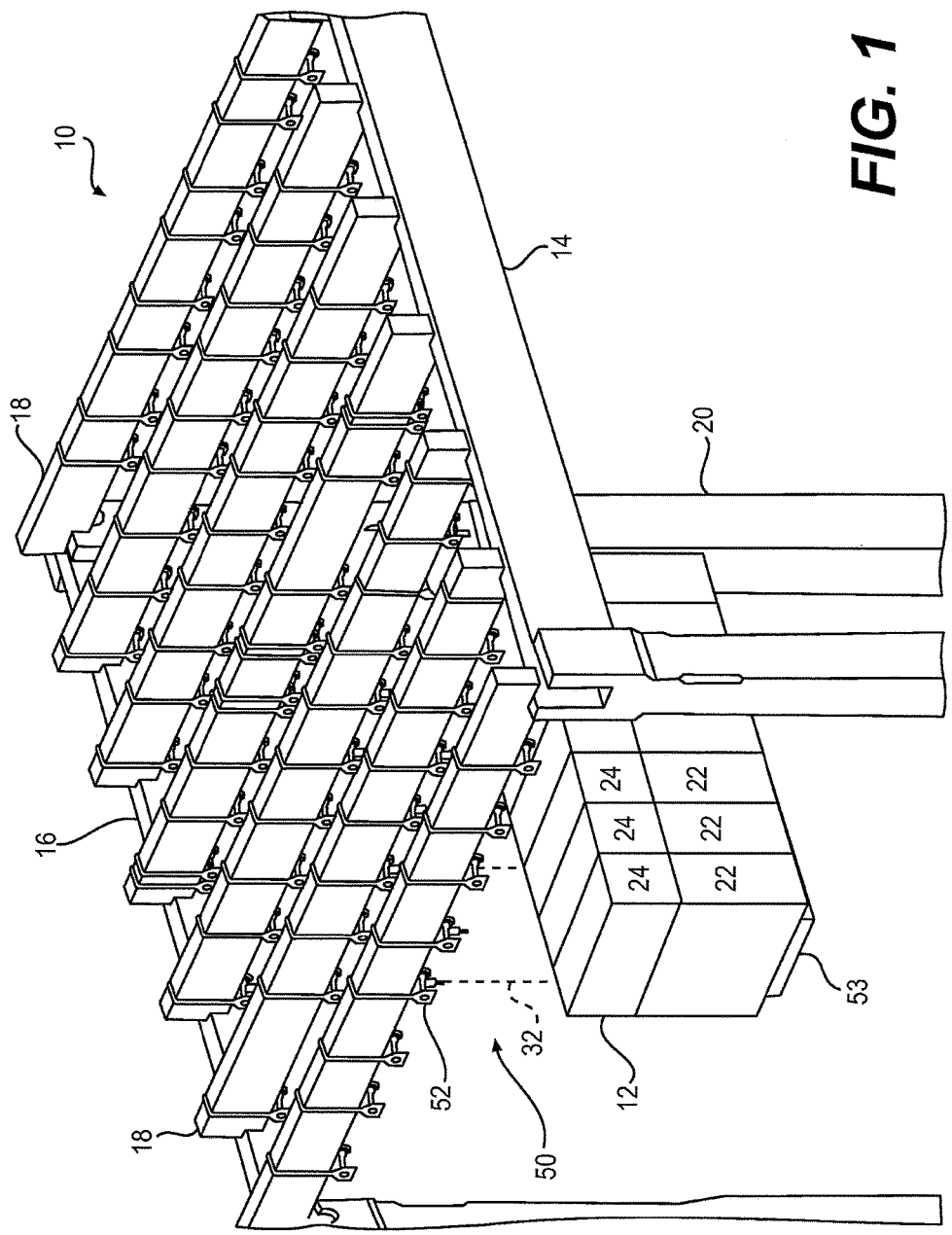
FIG. 1 is a perspective view of hanging fill system in accordance with an embodiment of the present invention.

An embodiment of the present inventive system for a modular hanging fill system, generally designated 10 is illustrated. Turning specifically to FIG. 1, a modular hanging fill system 10 is illustrated having a modular fill block 12 that is comprised of multiple fill packs 22 and 24 that form the fill block 12. The modular hanging fill system 10 includes a series of longitudinal beams 14 and 16 having cross beams 18 extending there between from which the fill block 12 hangs. The longitudinal beams and cross beams combine to form a grid like structure from which the fill block 12 hangs. The longitudinal 14, 16 and cross beams are support by a series of columns 20. The modular fill block 12 is supported by a series of fill supports 50 (that will be discussed in further detail below) that comprises an upper latching portion 52 that connects to the cross beams 18 and a lower base portion 53 upon which the fill block 12 sits.

Figure 2:
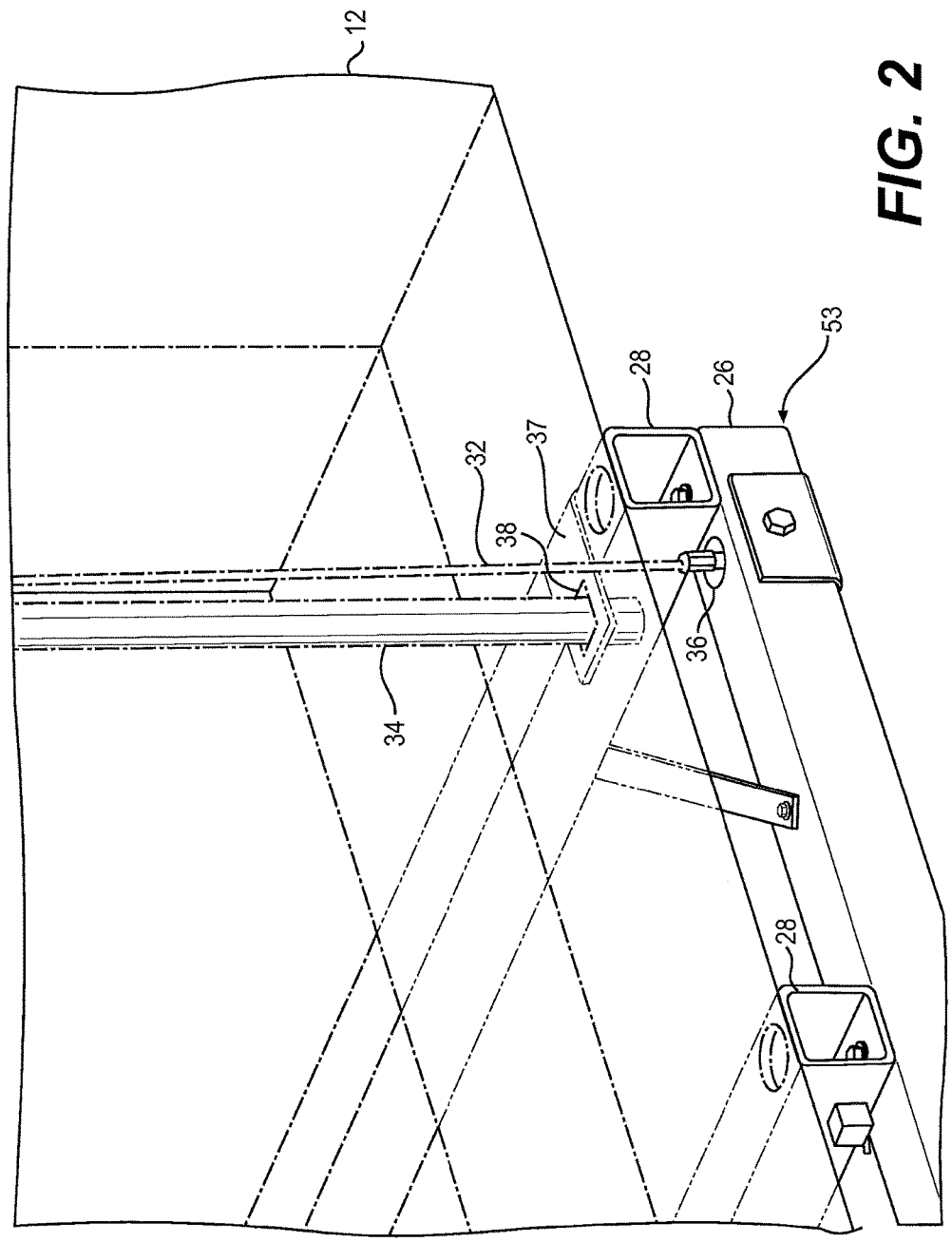
FIG. 2 is a detailed perspective view of the hanging fill system illustrated in FIG. 1.

Turning now to FIG. 2, a detailed view of the bottom portion 53 of the fill support is illustrated in more detail. The bottom portion 53 comprises transverse support beams 26 (one pictured) with longitudinal beams 28 extending there between. The fill support 50, also includes cable 32 that extends from the upper portion 52 to the transverse support beam where it attaches at an attachment port 36. FIG. 2 further illustrates a stake 34 that extends through the fill block 12 (shown transparent for clarity) where it engages a receiving portion 37 via its slot 38. The receiving portion 37 extends from the cross beam 28. The stake 34 may be any conduit or rod that extends through said fill block 12. While the stake 34 is depicted in a vertical orientation or normal position, to the bottom portion 53, the stake 34 may alternatively be oriented at an angle or sloped orientation. For example, the stake 34 may extend within a flute of cross-corrugated fill or the like.

Figure 3:
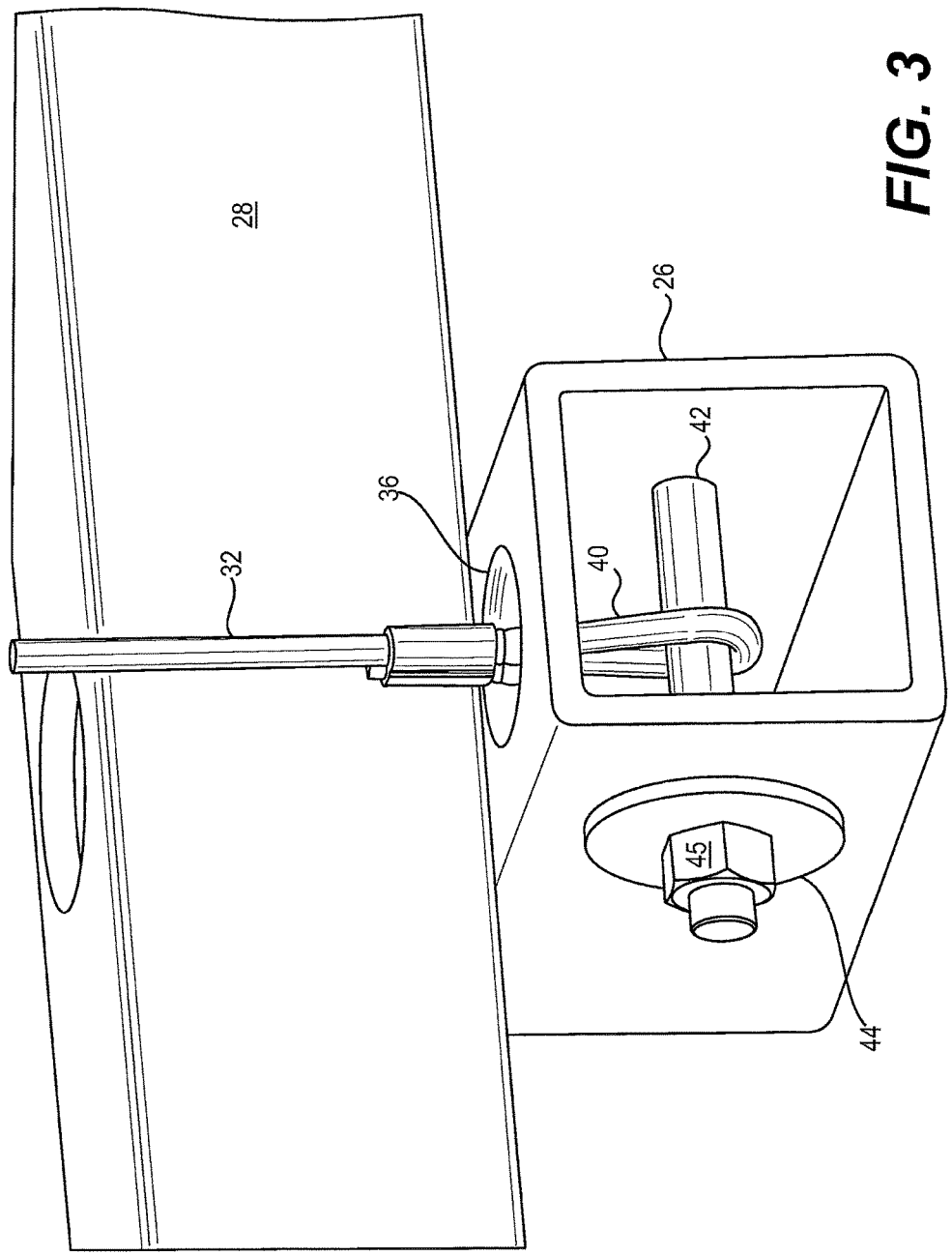
FIG. 3 is a detailed view of a connection point of the hanging fill system in accordance with an embodiment of the present invention.

Turning now to FIG. 3, a detailed end view of the transverse beam 26 is illustrated showing the support cable 32 engaging the side beam 26. As illustrated, in one embodiment of the present invention, the support cable 32 extends through the port 36 of the side beam 26 and engages and is connected to the said beam 26 via a bolt and loop connection. The aforementioned bolt and loop connection includes a loop 40 at the end of the support cable 32 that encircles a bolt 42 that extends within the interior of the beam 26. The bolt 42 may be secured to the beam 26 via a washer 44 and nut 45 connection. The bolt 42 may be replaced by a pin. Alternatively, the bolt or pin may be secured by a mechanical attachment means, for example, weld, push caps, cotter pins or screw connection.

Figure 4:
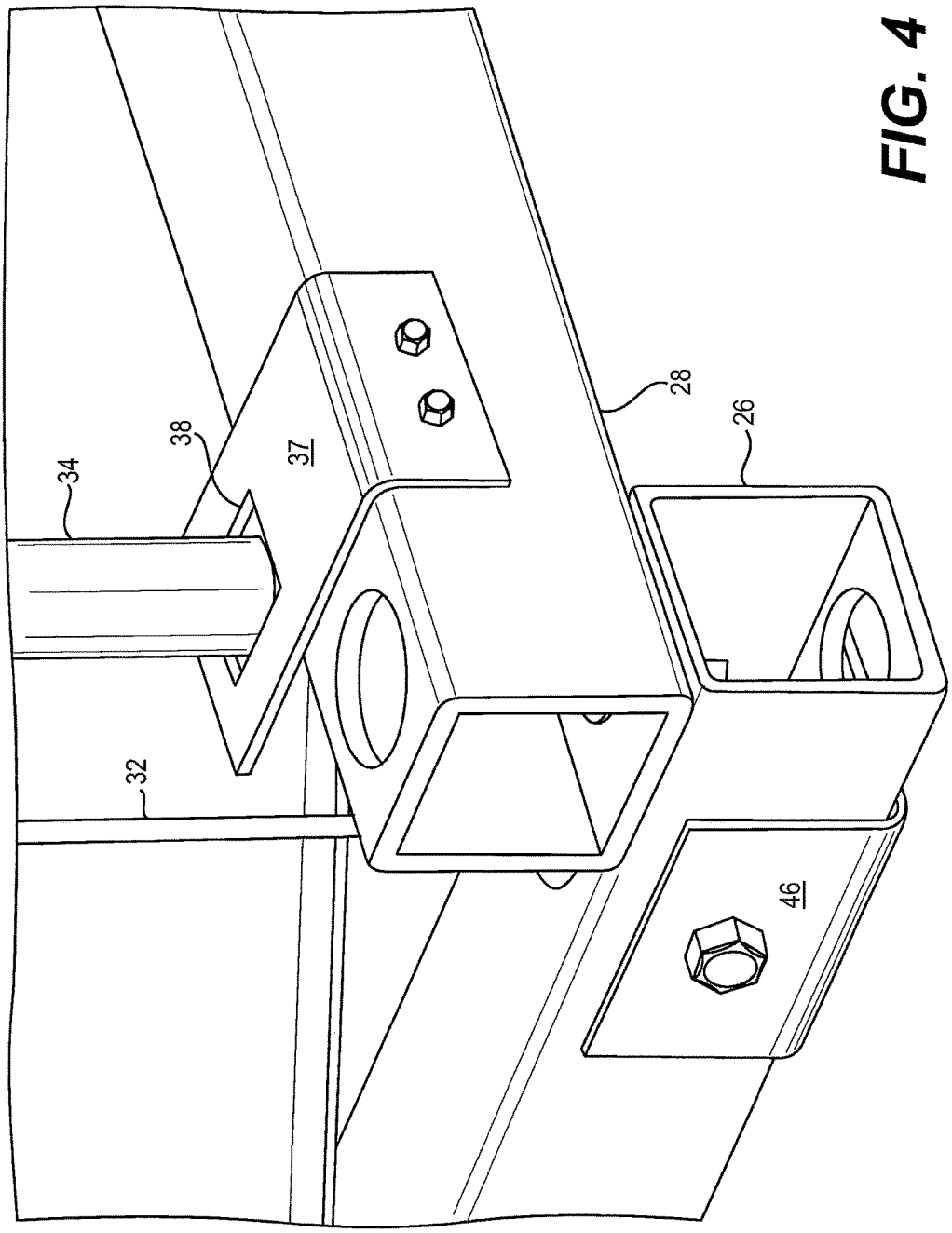
FIG. 4 is another detailed perspective view of the hanging fill system illustrated in FIG. 1.

Turning now to FIG. 4, another detailed end view of the bottom portion 53 of the support system is depicted. As illustrated in FIG. 4, the receiving portion 37 and the slot 38 are illustrated having the stake 34 inserted therein. FIG. 4 also depicts a bracket 46 that functions to support transverse beam 26. FIG. 4 further illustrates in detail the receiving portion 37 having the slot 38 wherein the stake 34 is inserted therein in combination with the cable 32 extending to engage the support beam 26.

Figure 5:
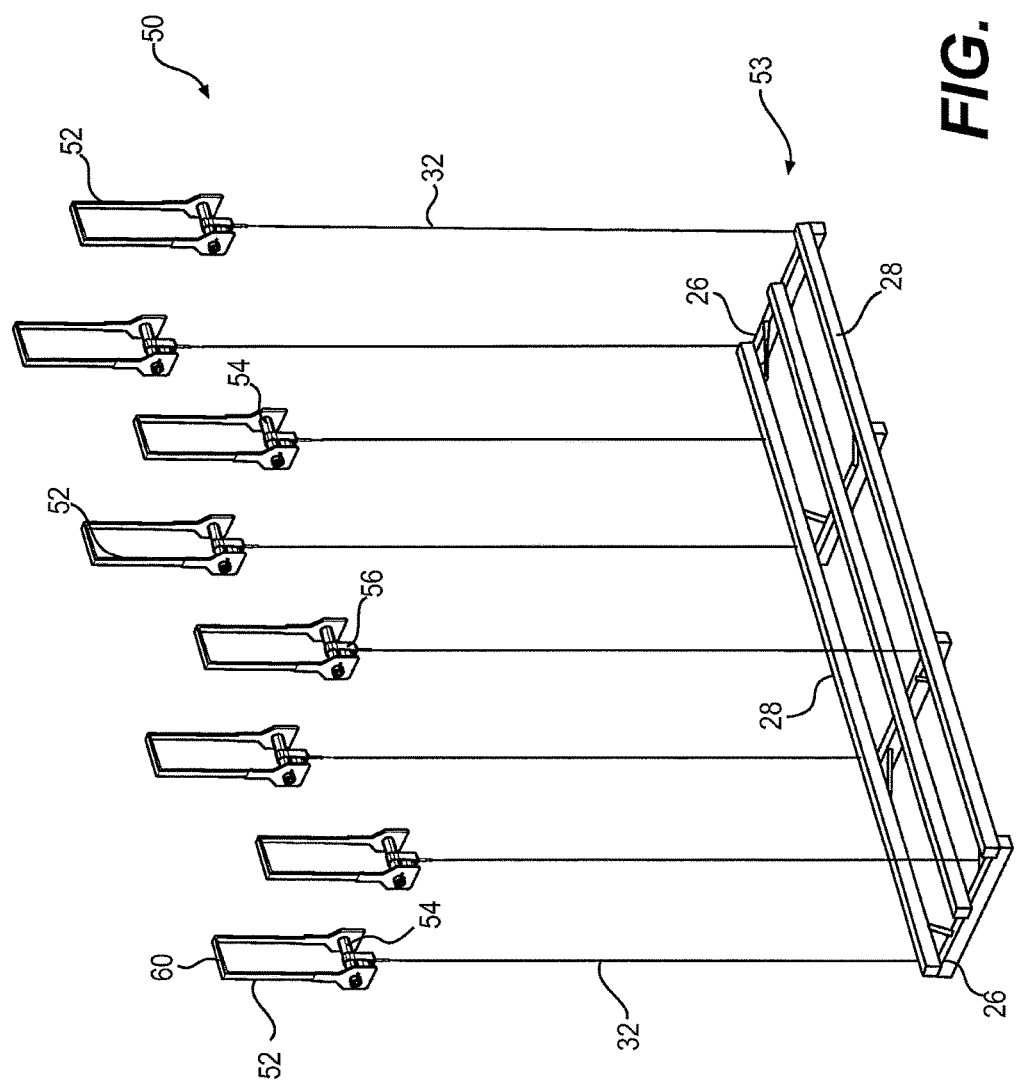
FIG. 5 is a partial schematic view of the fill support system in accordance with an embodiment of the present invention.
Figure 6:
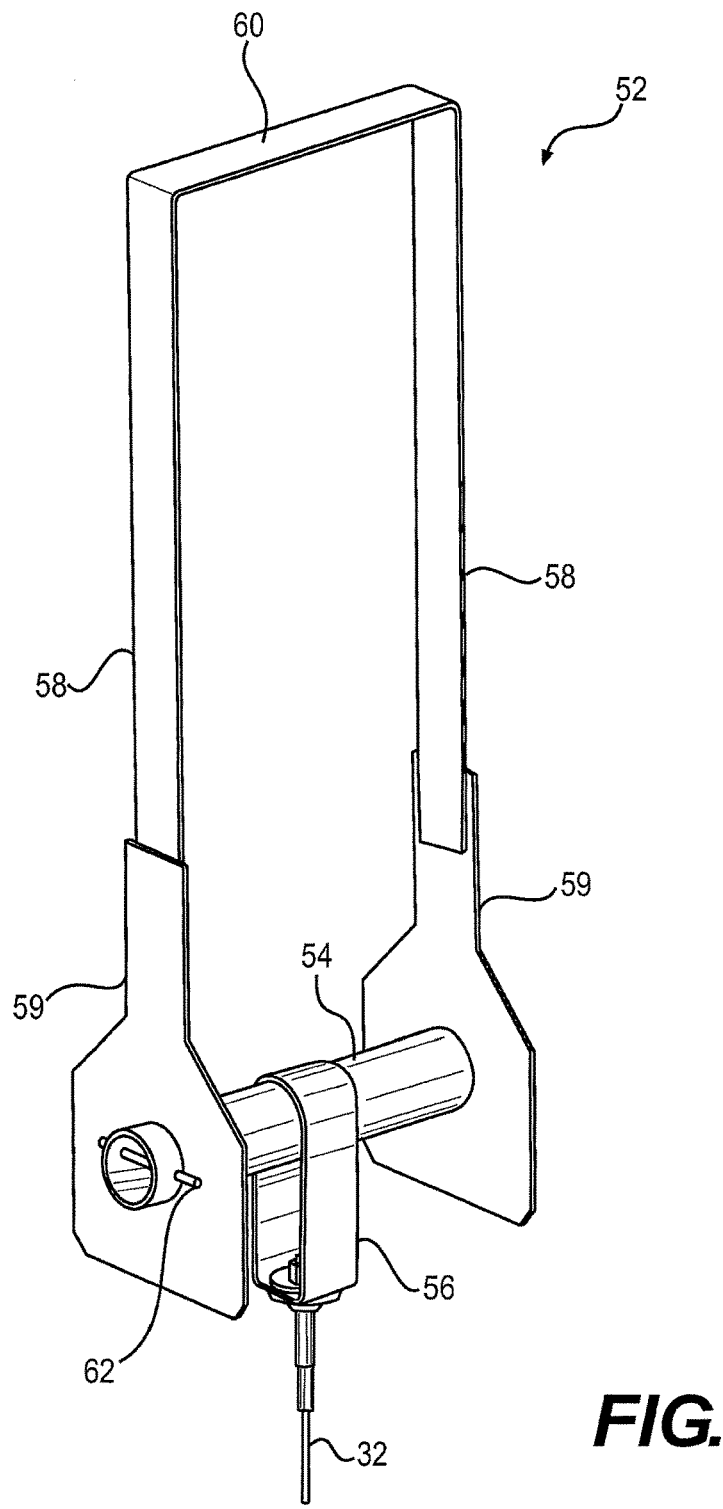
FIG. 6 is a detailed view of the fill support system illustrated in FIG. 5.

Turning now to FIGS. 5 and 6, the fill support system, generally designated 50, is illustrated having the previously described latching portion 52 and the previously described base portion 53. Whereas FIG. 5 schematically depicts the fill support system 50 without the fill having the upper and lower portions, FIG. 6 is a detailed illustration of the latching portion 52.

The latching portion 52 comprises a shaft 54 that extends between a pair of side struts 58. The side struts 58 are connected via a top portion 60. In one embodiment of the present invention, the side struts 58 may comprise two components, an upper portion that engages the top 60 and a lower portion 59 through which the shaft 54 extends. Alternatively, the latching portion may be a single, integral piece if desired. As illustrated in FIG. 6, one embodiment of the present invention utilizes a cotter pin 62 or the like that retains the shaft 54 between the struts 58. In one embodiment of the present invention, a cotter pin 62 may be used on both ends of the shaft 54 whereas other embodiments may employ only a single cotter pin 62. Alternatively, the shaft 54 may be retained via a compression fit or any other mechanical means or method.

Figure 7:
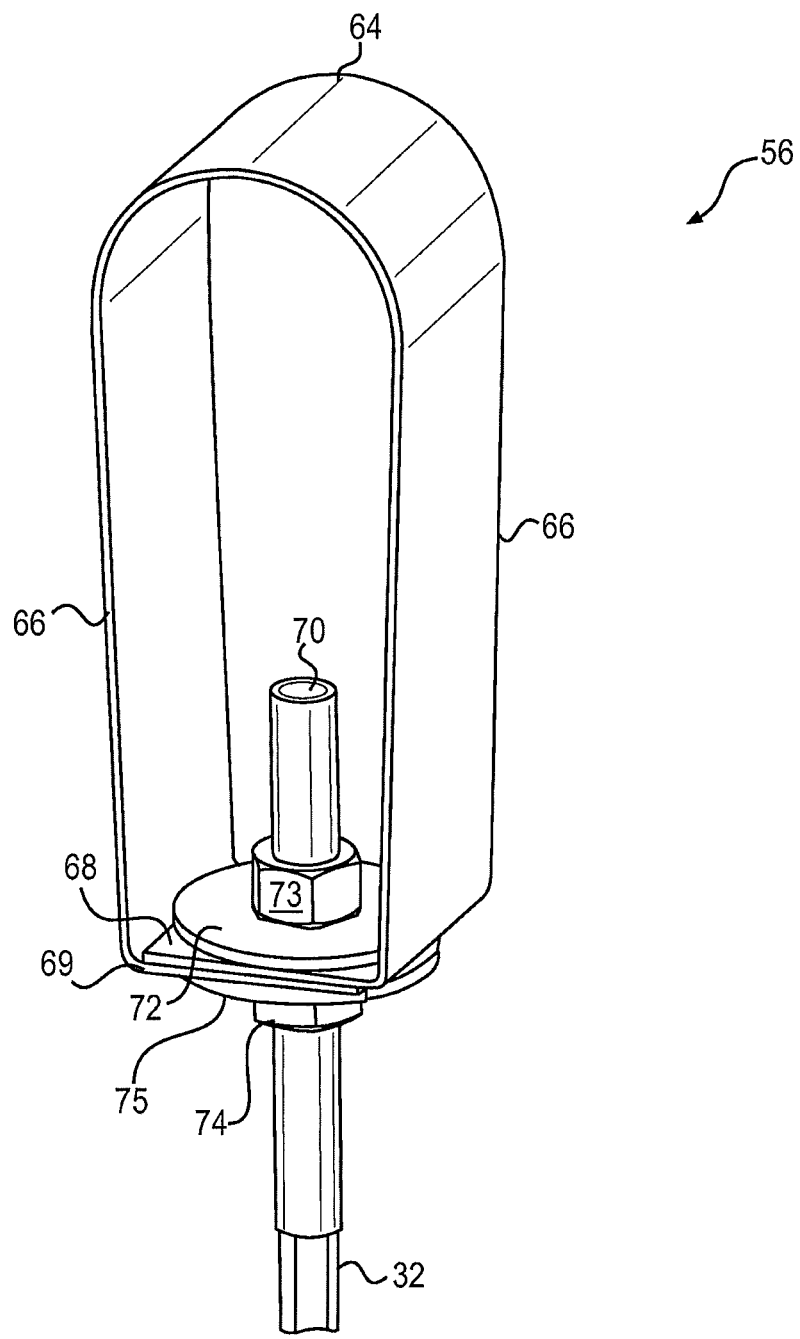
FIG. 7 is another detailed view of the fill support system depicted in FIGS. 5 and 6.

As depicted in FIG. 6, and more specifically in FIG. 7, the cable 32 connects or is attached to the latching portion 52 via the shaft 54 by way of an attachment loop 56. Turing specifically to FIG. 7, the attachment loop 56 has an upper curved section 64 that extends between first and second sides 66. The first and second sides 66 extend generally parallel to one another in opposing relationship. The attachment loop 56 further includes a base that is comprised of an first flap 68 and a second flap 69. As illustrated in one embodiment of the present invention, flap 68 and flap 69 overlap one another to form the base of the attachment loop 56. Alternatively, in another embodiment, the base may be a solid piece and not comprise separate flaps as shown.

The cable 32 extends through the flaps 68 and 69 wherein the end 70 extends into the loop 56. The end 70 may be threaded wherein it engages a washer 72 and nut 73 on one side of the flaps 68, 69 and another nut 74 and washer 75 on the other side of the flaps 68, 69. The cable 32 may be alternatively be connected or attached to the loop 56 by any preferred attachment means or method.

During operation, the fill block 12 is comprised of multiple individual fill packs. These individual fill packs are assembled at the factory wherein the stake 34 or multiple stakes is inserted through said packs as previously discussed. The stakes 34 may be constructed of any material, for example, polyvinyl chloride (PVC) or any other preferred plastic or alternative material. The stakes 34 extend through "normal" internal paths of the fill packs and function to prevent the fill modules from shifting or losing their shape during transportation and assembly. The stakes 34 also function to lock or anchor the fill pack(s), and thus the fill block 12, to the base frame 53. Also, in one embodiment of the present invention, the various cables 32 that support the fill media may be inserted prior to shipping the fill block 12 if desired.

Upon the fill packs 12 arriving at the installation site, for those embodiments shipped with the cables installed, the cables are attached to the base portion 53 and to the beam 26. The cable 32 is next attached to the upper portion 52 of the fill support system 50. During the installation process, the upper portions 52 of the fill support system 50 are typically hung from a beam or the like, similar to that illustrated in FIG. 1, prior to the fill pack installation in the tower. The aforementioned beam is typically part of an overall, larger frame structure or the support assembly of the cooling tower. As previously described, the cable 32 engages and is attached to the upper portion 52 via the loop 56 and shaft 54. Alternatively, the cable may be inserted through the fill media packs 12 are attached to the base portion 53 and to the beam 26 at the site. The cable 32 is then connected to the upper portion 52 of the fill support system 50. As in the embodiment described above, the cable 32 engages and is attached to the upper portion 52 vial the loop 56 and shaft 54.

In this position fill block 12 maybe secured to the base 53 as needed however as illustrated in FIGS. 2 and 4, the stakes also assist to secure the fill packs 12 by engaging the receiving portion 37 and inserted through the slots 38. The stake's 34 engagement with the slot 38 helps to secure the fill block 12 to the base 53 of the fill support system 50.

The above-described process is repeated as necessary depending upon the size of the respective cooling tower in which the fill packs 12 are employed. Moreover, the above-described fill system allows for the fill to be efficiently installed and replaced due to the ability to assemble the fill packs at the manufacturing plant and ship in the pre-assembled state. Once arriving at the cooling tower site, the individual packs are efficiently installed in the manner described above.

Figure 8:
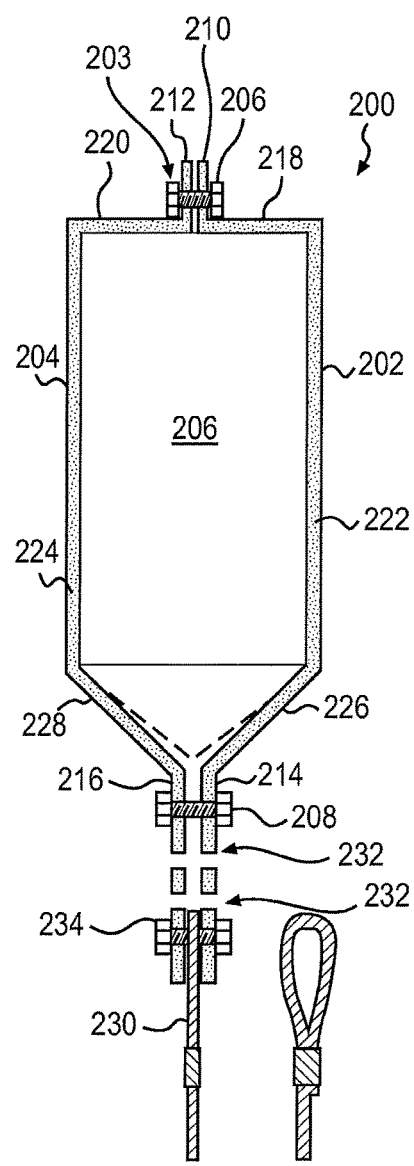
FIG. 8 is a schematic view of a bracket apparatus in accordance with another embodiment of the present invention.
Figure 9:
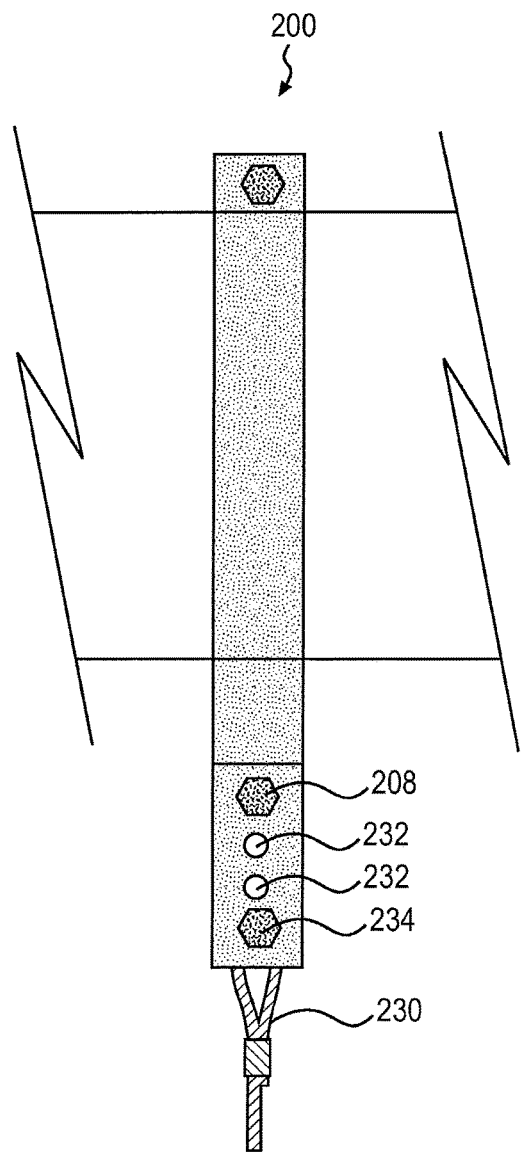
FIG. 9 is a schematic side view of the bracket apparatus depicted in FIG. 8.

Turning now to FIG. 8 and FIG. 9, an alternative embodiment of the present invention is depicted, wherein a beam bracket generally designated 200 is illustrated. The beam bracket comprises two sides or halves 202 and 204 that encircle the support beam 206 from which the fill block (not pictured) suspends. As illustrated in FIG. 8, the halves 202 and 204 are retained or attached to one another via an upper or top bolt 206 and a bottom or lower bolt 208. The upper bolt 206 extends through first and second top flanges 210 and 212 each corresponding to a halve 202, 204. Similarly, the lower bolt 208 extends through first and second lower flanges 214 and 216 each corresponding to a halve 202, 204.

As depicted in FIG. 8, each halve comprises a top portion 218 and 220, opposing side walls 222 and 224 and sloped bottom portions 226 and 228. As illustrated, the sloped portions 226, 228 extend from each respective side wall 222, 224 to each respective flange 214, 216 through which the bolt 208 extends as previously described. In the embodiment illustrated, the bolt 208 may be rotated to collapse or pull together the sloped portions 226, 228 changing the angle of said sloped portions 226, 228 as indicated by FIG. 8. Alternatively, the bolt 208 may be rotated in the opposite direction, "loosening" the angle of the sloped portions 226, 228. The aforementioned collapsing and releasing of the of the sloped portions 226, 228 via the bolt 208 may be used to adjust the height of the fill block by moving the cable upward or downward depending upon the angle of the sloped portions 226, 228.

Continuing to refer to both FIGS. 8 and 9, the lower flanges 214, 216, include a series of holes or bores 232 that allow for the cable 230 to be attached at various heights via a bolt 234. The above-described holes or bores 232 allow for the fill block to be adjusted in terms of hanging height.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for assembling a fill block for use in a cooling tower, comprising the steps of:
    placing a first heat exchange fill pack on a base;
    inserting a first stake through said first heat exchange fill pack, the base comprising a receiving portion, at least one longitudinal cross beam and at least one transverse support beam;
    extending the receiving portion from a side of the at least one longitudinal cross beam, the receiving portion having a slot adjacent to the at least one longitudinal cross beam; and
    engaging the base with said stake to retain the first fill pack to the base, the stake extending through the slot.

2. The method according to claim 1, further comprising:
    placing at least a second heat exchange fill pack on the base;
    inserting a second stake through said at least second heat exchange fill pack;
    engaging the base with said second stake to retain the at least second heat exchange fill pack to the base.

3. The method according to claim 1, further comprising the steps of:
    placing a plurality of heat exchange fill packs on the base;
    inserting a plurality of stakes through the plurality of heat exchange fill packs;
    engaging the base with the plurality of stakes to retain the plurality of fill packs.

4. The method according to claim 1, further comprising the steps of:
    inserting a cable through the first heat exchange fill pack; and
    attaching the cable to the base frame.

5. The method according to claim 4, further comprising the steps of:
    installing the heat exchange fill packs in a cooling tower by attaching the cable to a hanging fill support bracket, comprising; and
    attaching the hanging fill support bracket to a cooling tower beam.

6. The method according to claim 5, wherein the hanging fill support bracket comprises:
    a first side having a first upper portion and a first lower portion;
    a second side opposing said first side that has a second upper portion and a second lower portion;

a top connected to said first and second sides that extends between said first and second upper portions; and a shaft having a first and second end that extends between the first lower portion and the second lower portion, wherein said shaft is retained by each said first and second lower portion.

7. The method according to claim 5, wherein the hanging fill support bracket comprises:
   a first halve having a first top portion, a second side wall and a first sloped portion;
   a second halve having a second top portion, a second side wall and a second sloped portion, wherein said second halve engages said first halve;
   a first bolt that engages said first top portion to said second top portion.

8. The method according to claim 5, wherein the hanging fill support bracket further comprises: a first halve having a first top portion, a second side wall and a first sloped portion; a second halve having a second top portion, a second side wall and a second sloped portion, wherein said second halve engages said first halve; a first bolt that engages said first top portion to said second top portion.

9. The method according to claim 8, wherein the hanging fill support bracket further comprises: a second bolt that engages said first sloped portion and said second sloped portion.

10. The method according to claim 9, wherein the hanging fill support bracket further comprises: a first flange extending from first top portion; a second flange extending from said first sloped portion; a third flange extending from said second top portion; and a fourth flange extending from said second sloped portion, wherein said first bolt extends through said first flange and said third flange to engage said first and second top portions.

11. The method according to claim 10, wherein the hanging fill support bracket further comprises: a second bolt that extends through second flange and said fourth flange to engage said first and second sloped portions.

12. The method according to claim 10, wherein the hanging fill support bracket further comprises: a series of holes dispose upon said second flange and said fourth flange.

* * * * *